United States Patent
Chen et al.

(10) Patent No.: US 8,129,669 B2
(45) Date of Patent: Mar. 6, 2012

(54) SYSTEM AND METHOD GENERATING MULTI-COLOR LIGHT FOR IMAGE DISPLAY HAVING A CONTROLLER FOR TEMPORALLY INTERLEAVING THE FIRST AND SECOND TIME INTERVALS OF DIRECTED FIRST AND SECOND LIGHT BEAMS

(75) Inventors: Gang Chen, Basking Ridge, NJ (US); Roland Ryf, Aberdeen, NJ (US)

(73) Assignee: Alcatel Lucent, Paris (FR)

( * ) Notice: Subject to any disclaimer, the term of this patent is extended or adjusted under 35 U.S.C. 154(b) by 517 days.

(21) Appl. No.: 12/009,991

(22) Filed: Jan. 22, 2008

(65) Prior Publication Data

US 2009/0185140 A1    Jul. 23, 2009

(51) Int. Cl.
*G01J 1/32* (2006.01)

(52) U.S. Cl. .................. 250/205; 250/214 R (58) Field of Classification Search .......... 250/205, 250/208.1, 214 R; 353/85, 75, 31, 34; 348/798, 348/744–758, 800–802; 359/887–892
See application file for complete search history.

(56) References Cited

U.S. PATENT DOCUMENTS

| | | |
|---|---|---|
| 3,546,374 A | 12/1970 | Graser, Jr. |
| 3,549,240 A | 12/1970 | Sawatari |
| 3,573,353 A | 4/1971 | Henriques et al. |
| 3,719,127 A | 3/1973 | Mueller |
| 4,281,904 A | 8/1981 | Sprague et al. |
| 4,410,839 A | 10/1983 | Dobkin |
| 4,471,445 A | 9/1984 | Pernick |
| 4,522,466 A | 6/1985 | Lindig et al. |
| 4,834,476 A | 5/1989 | Benton |
| 4,986,619 A | 1/1991 | Walker |
| 5,032,002 A | 7/1991 | Fonneland et al. |
| 5,166,742 A | 11/1992 | Kobayashi |
| 5,172,251 A | 12/1992 | Benton |
| 5,192,946 A | 3/1993 | Thompson |
| 5,239,322 A | 8/1993 | Takanashi |
| 5,272,473 A | 12/1993 | Thompson |

(Continued)

FOREIGN PATENT DOCUMENTS

DE    2506582 A1    8/1976

(Continued)

OTHER PUBLICATIONS

"Study of a New Ytterbium Doped Phosphate Laser Glass," DAI Shixun et al., Chinese Science Bulletin, vol. 47, No. 3, Feb. 2002, pp. 255-259.

(Continued)

*Primary Examiner* — Que T Le
(74) *Attorney, Agent, or Firm* — Jay M. Brown (57) ABSTRACT

System including first and second light sources and controller. First light source is configured to generate first light beam of first perceived color. Second light source is configured to generate second light beam of different second perceived color. Controller is configured to direct light from first light beam to an image projector during first time intervals and to direct light from second light beam to an image projector during second time intervals. First light source generates first light beam with first intensity. Second light source generates second light beam with different second intensity. Controller is configured to temporally interleave first and second time intervals such that second time intervals are longer than first time intervals. Method also provided.

26 Claims, 4 Drawing Sheets

U.S. PATENT DOCUMENTS

| | | | |
|---|---|---|---|
| 5,327,270 A | 7/1994 | Miyatake | |
| 5,440,352 A | 8/1995 | Deter | |
| 5,506,597 A | 4/1996 | Thompson et al. | 345/85 |
| 5,596,451 A | 1/1997 | Handschy | |
| 5,617,227 A | 4/1997 | De Bougrenet De La Tocnaye | |
| 5,663,775 A | 9/1997 | Kawamura | |
| 5,789,819 A | 8/1998 | Gnade | |
| 5,798,819 A | 8/1998 | Hattori | |
| 5,834,331 A | 11/1998 | Razeghi | |
| 6,211,848 B1 | 4/2001 | Plesniak | |
| 6,250,778 B1 | 6/2001 | Doumuki | |
| 6,304,237 B1 | 10/2001 | Karakawa | |
| 6,323,984 B1 | 11/2001 | Trisnadi | 359/245 |
| 6,426,836 B2 | 7/2002 | Dorsel | |
| 6,577,429 B1 | 6/2003 | Kurtz et al. | 359/279 |
| 6,594,090 B2 | 7/2003 | Kurschwitz | |
| 6,600,590 B2 | 7/2003 | Roddy | |
| 6,621,235 B2 | 9/2003 | Chang | |
| 6,625,381 B2 | 9/2003 | Roddy | |
| 6,771,326 B2 * | 8/2004 | Flint | 348/744 |
| 6,791,739 B2 | 9/2004 | Ramanujan et al. | 359/279 |
| 6,797,983 B2 | 9/2004 | Chen | |
| 6,870,650 B2 | 3/2005 | Kappel | |
| 6,876,484 B2 | 4/2005 | Greywall | |
| 6,902,276 B2 | 6/2005 | Glenn | |
| 6,906,839 B2 | 6/2005 | Gerchberg | |
| 6,940,577 B2 | 9/2005 | Kozhukh | |
| 6,984,917 B2 | 1/2006 | Greywall | |
| 7,099,063 B2 | 8/2006 | Greywall | |
| 7,138,648 B2 | 11/2006 | Kneissl | |
| 7,147,331 B2 * | 12/2006 | Yamazaki et al. | 353/31 |
| 7,156,522 B2 | 1/2007 | Plut | |
| 7,161,608 B2 | 1/2007 | Pettitt et al. | |
| 7,244,028 B2 | 7/2007 | Govorkov | |
| 7,268,852 B2 | 9/2007 | Kuan | |
| 7,289,209 B2 | 10/2007 | Kowarz et al. | |
| 7,298,532 B2 | 11/2007 | Thomas et al. | |
| 7,307,786 B2 | 12/2007 | Hatjasalo | |
| 7,317,403 B2 | 1/2008 | Grootes | |
| 7,342,658 B2 | 3/2008 | Kowarz et al. | |
| 7,355,657 B2 | 4/2008 | Chilla | |
| 7,413,311 B2 | 8/2008 | Govorkov | |
| 7,423,808 B2 | 9/2008 | Lee | |
| 7,481,541 B2 * | 1/2009 | Maximus et al. | 353/85 |
| 7,492,948 B2 | 2/2009 | Gluckstad | |
| 7,595,622 B1 | 9/2009 | Tomiyoshi et al. | |
| 7,646,154 B2 | 1/2010 | Kang | |
| 7,646,518 B2 | 1/2010 | Kasazumi | |
| 7,688,002 B2 | 3/2010 | Ashdown | |
| 7,782,521 B2 | 8/2010 | Khan | |
| 7,843,150 B2 | 11/2010 | Wang | |
| 2001/0019434 A1 | 9/2001 | Popovich et al. | |
| 2001/0022613 A1 | 9/2001 | Matsui | |
| 2002/0034710 A1 | 3/2002 | Morris et al. | |
| 2003/0025842 A1 | 2/2003 | Saccomanno | |
| 2003/0117022 A1 | 6/2003 | Janning | |
| 2003/0165013 A1 | 9/2003 | Doany | |
| 2003/0218794 A1 | 11/2003 | Takeda et al. | |
| 2004/0008392 A1 | 1/2004 | Kappel | |
| 2004/0239880 A1 | 12/2004 | Kapellner et al. | 353/20 |
| 2004/0263802 A1 | 12/2004 | Seki et al. | |
| 2005/0013005 A1 | 1/2005 | Rogers | |
| 2005/0219675 A1 | 10/2005 | Aksyuk | |
| 2005/0243282 A1 | 11/2005 | Peterson | |
| 2005/0264271 A1 | 12/2005 | Lam et al. | |
| 2006/0018025 A1 | 1/2006 | Sharon | |
| 2006/0028961 A1 | 2/2006 | Kim et al. | |
| 2006/0029252 A1 | 2/2006 | So | |
| 2006/0061214 A1 | 3/2006 | Chapuis | |
| 2006/0066964 A1 | 3/2006 | Greywall | |
| 2006/0109386 A1 | 5/2006 | Serafimovich | |
| 2006/0109553 A1 | 5/2006 | Serafimovich | |
| 2006/0126022 A1 | 6/2006 | Govorkov | |
| 2006/0126151 A1 | 6/2006 | Aksyuk | |
| 2006/0175622 A1 | 8/2006 | Richards | |
| 2006/0181770 A1 | 8/2006 | Lee | |
| 2006/0227440 A1 | 10/2006 | Gluckstad | |
| 2006/0267449 A1 | 11/2006 | Aksyuk | |
| 2007/0024213 A1 | 2/2007 | Shteynberg et al. | |
| 2007/0046907 A1 | 3/2007 | Shin | 353/119 |
| 2007/0058181 A1 | 3/2007 | Hatori | |
| 2007/0070296 A1 | 3/2007 | Iwanaga | |
| 2007/0070302 A1 | 3/2007 | Govorkov | |
| 2007/0132866 A1 | 6/2007 | Lee | |
| 2007/0153378 A1 | 7/2007 | Lee | |
| 2007/0251916 A1 | 11/2007 | Akahane | |
| 2007/0257623 A1 | 11/2007 | Johnson et al. | |
| 2007/0262724 A1 | 11/2007 | Mednik et al. | |
| 2007/0279731 A1 | 12/2007 | Blumberg | |
| 2008/0018266 A1 | 1/2008 | Yu | |
| 2008/0055478 A1 | 3/2008 | Jaspers | |
| 2008/0100224 A1 | 5/2008 | Felder | |
| 2008/0116818 A1 | 5/2008 | Shteynberg et al. | |
| 2008/0158513 A1 | 7/2008 | Bartlett | |
| 2008/0297128 A1 | 12/2008 | Xu et al. | |
| 2009/0003695 A1 | 1/2009 | Chiang | |
| 2009/0009719 A1 | 1/2009 | Ryf | |
| 2009/0096999 A1 | 4/2009 | Frahm | |
| 2009/0153579 A1 | 6/2009 | Ichikawa | |
| 2009/0158140 A1 | 6/2009 | Bauchot et al. | |
| 2009/0191489 A1 | 7/2009 | Sandstrom | |
| 2009/0284554 A1 | 11/2009 | Doser | |
| 2009/0310087 A1 | 12/2009 | Itoh | |

FOREIGN PATENT DOCUMENTS

| | | | |
|---|---|---|---|
| EP | 1011186 A2 | 6/2000 | |
| EP | 1 283 434 A2 | 2/2003 | |
| EP | 1292134 A2 | 3/2003 | |
| EP | 1 703 318 A1 | 9/2006 | |
| EP | 1 734 771 A1 | 12/2006 | |
| EP | 1 750 441 A2 | 2/2007 | |
| JP | 04105521 A | 4/1992 | |
| JP | 07336776 A | 12/1995 | |
| JP | 2002131689 A | 5/2002 | |
| WO | WO 2004/064410 A1 | 7/2004 | |
| WO | WO2006104704 A1 | 10/2006 | |
| WO | WO2007/024503 A1 | 3/2007 | |
| WO | WO2008108947 A1 | 9/2008 | |
| WO | WO2009040822 A2 | 4/2009 | |
| WO | WO2010023444 A1 | 3/2010 | |

OTHER PUBLICATIONS

"A Tunable Short (5cm) Glass Fiber Laser for Helium Optical Pumping," Schearer et al., Journal De Physique IV, 1991, published online by EDP Sciences at http://dx.doi.org/10.1051/jp4:1991787, 4 pages.

"Spectrum Stability of a Broadband 1060nm Nd-Doped Fibre Laser," Electronics Letters, vol. 26, No. 13, Jun. 21, 1990, 3 pages.

"Efficient Second Harmonic Generation of Femtosecond Laser at 1 Micrometer," Zhu et al., vol. 12, No. 10, May 17, 2004, Optics Express 2150, 6 pages.

"Polarization Engineering for LCD Projection," Robinson et al., Wiley, Chichester England, 2005, Chapter 11, pp. 257-275.

"PVPro Enabling personal video projectors", Light Blue Optics Ltd., www.lightblueoptics.com, (2006), 5 pp.

Gerchberg et al., "Phase determination from image and diffraction plane pictures in electron microscope", OPTIK, vol. 34, No. 3 (1971), pp. 275-284.

Gerchberg et al., "A practical algorithm for determination of phase from image and diffraction plane pictures," OPTIK, vol. 35, No. 2 (1972), pp. 237-246.

"A Tale of Two Cats," www.ysbl.york.ac.uk, (Dec. 15, 2006), 3pp.

Greene, "Pocket Projectors," www.technologyreview.com, Technology Review, (Dec. 6, 2006), 3 pp.

Greene, "Ultra-colorful TV," www.technologyreview.com, Technology Review, (Oct. 24, 2006), pp. 1-4.

Lucente, "Diffraction-specific fringe computation for electro-holography," Ph.D. thesis, Dept.Elect.Eng'g-Comp.Sci., Mass.Inst.Tech., www.mit.edu, (Sep. 1994), pp. 13-174.

Gerchberg, "Super-resolution through error energy reduction," OPTICA ACTA vol. 21, No. 9 (1974), pp. 709-720.

"Novalux delivers high-power, blue, solid-state light sources to consumer electronics partners," www.novalux.com, (Nov. 7, 2005), 2 pp.

Robinson et al., "Single and Dual Panel LC Projection Systems," Chapter 11 of "Polarization Engineering for LCD Projection," John Wiley & Sons Ltd, (2005), pp. 257-275.

Watson, G.P. et al., "Comparison of tilting and piston mirror elements for 65 nm mode spatial light modulator optical maskless lithography," J. Vac. Technol., vol. B 22, No. 6, pp. 3038-3042, Nov./Dec. 2004.

Fienup, J.R., "Reconstruction of an object from the modulus of its Fourier transform," Optics Letters, vol. 3, No. 1, pp. 27-29, Jul. 1978.

Fienup, J.R. "Phase retrieval algorithms: a comparison." Applied Optics, vol. 21, No. 15, pp. 2758-2769, Aug. 1, 1982.

Zalevsky, Z. et al., "Gerchberg-Saxton algorithm applied in the fractional Fourier or the Fresnel domain," Optics Letters, vol. 21, No. 12, pp. 842-844, Jun. 15, 1996.

U.S. Appl. No. 12/017,984 Chen et al. Jan. 22, 2008.
U.S. Appl. No. 12/017,440 Chen et al. Jan. 22, 2008.
U.S. Appl. No. 12/009,851 Chen et al. Jan. 22, 2008.
U.S. Appl. No. 11/713,483 Chen et al. Mar. 2, 2007.
U.S. Appl. No. 11/713,207 Giles et al. Mar. 2, 2007.
U.S. Appl. No. 11/681,376 Aksyuk et al. Mar. 2, 2007.
U.S. Appl. No. 11/713,155 Aksyuk et al. Mar. 2, 2007.

Kerigan, SC, et al., "Perceived Speckle Reduction in Projection Display Systems", IP.com Journal, IP.com Inc., IP.com No. IPCOM000118774D; West Henrietta, NY, Jul. 1, 1997, cover page, pp. 9-11, XP-013106711.

"DC-DC Converter Basics," published at www.powerdesigners.com 12 pp.

J. W. Goodman, "Some Fundamental Properties of Speckle", *Journal of the Optical Society of America, American Institute of Physics*, New York, vol. 66, No. 11, Nov. 1, 1976, pp. 1145-1150, XP-002181682.

Moulton et al., "High-Powered RGB Laser Source for Displays," presented at the IMAGE 2002 Conference, Scottsdale, Arizona, Jul. 8-Dec. 2002, 4 pp.

"Presentation Industry's First Texas Instruments Digital Light Processing™ Technology Projector With DCDi™ for Color Critical and Home Theater Applications," Dec. 18, 2001, downloaded from http://www.hcinema.de/pdf/presse/mitsubishixd200-press-en.pdf, 2 pp.

PCT International Search Report dated Jun. 10, 2008 (PCT/US2008/002551) 3 pages.

PCT International Search Report dated Jul. 8, 2009 (PCT/US2009/000350) 4 pages.

PCT International Search Report dated May 18, 2009 (PCT/US2009/000352) 3 pages.

PCT International Search Report dated Jun. 16, 2009 (PCT/US2009/000349) 2 pages.

PCT International Search Report dated Jul. 11, 2008 (PCT/US2008/002780) 2 pages.

\* cited by examiner

SYSTEM AND METHOD GENERATING MULTI-COLOR LIGHT FOR IMAGE DISPLAY HAVING A CONTROLLER FOR TEMPORALLY INTERLEAVING THE FIRST AND SECOND TIME INTERVALS OF DIRECTED FIRST AND SECOND LIGHT BEAMS

BACKGROUND OF THE INVENTION

1. Field of the Invention

This invention generally relates to visual display systems that utilize multi-color light source beams to generate visual displays.

2. Related Art

This section introduces aspects that may help facilitate a better understanding of the inventions. Accordingly, the statements of this section are to be read in this light and are not to be understood as admissions about what is prior art or what is not prior art.

Various types of visual display systems can utilize light source beams. These systems can include, e.g., an image projector, such as a spatial light modulator. Examples of spatial light modulators include liquid crystal displays, liquid crystal on silicon displays, and digital light processors. Visual display systems can receive and display color control data utilizing an image projector. Despite these developments, there is a continuing need for improved visual display systems utilizing light source beams.

SUMMARY

In an example of an implementation, a system is provided, including a first light source, a second light source, and a controller. The first light source is configured to generate a first light beam of a first perceived color. The second light source is configured to generate a second light beam of a different second perceived color. The controller is configured to direct light from the first light beam to an image projector during first time intervals and to direct light from the second light beam to an image projector during second time intervals. The first light source generates the first light beam with a first intensity. The second light source generates the second light beam with a different second intensity. The controller is configured to temporally interleave the first and second time intervals such that the second time intervals are longer than the first time intervals.

As another example of an implementation, a method is provided, that comprises providing first and second light sources and a controller. The first light source so provided is configured to generate a first light beam of a first perceived color. The second light source so provided is configured to generate a second light beam of a different second perceived color. The first light source generates the first light beam with a first intensity, and the second light source generates the second light beam with a different second intensity. The controller so provided is configured to direct light from the first and second light beams to an image projector. The method includes causing the controller to direct light from the first light beam to an image projector during first time intervals, and to direct light from the second light beam to an image projector during second time intervals. Causing the controller to direct light from the first and second light beams to an image projector includes configuring the controller to temporally interleave the first and second time intervals such that the second time intervals are longer than the first time intervals.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention. Moreover, in the figures, like reference numerals designate corresponding parts throughout the different views.

DETAILED DESCRIPTION

Light sources having three different colors may for example be utilized in a multi-color display system. As examples, these colors may respectively appear red, green, and blue to the human eye, and may be utilized as the three primaries to create color display images. Such a multi-color display system may, for example, include an image projector. Such a display system may utilize illumination sources of three primary colors to illuminate a spatial light modulator (SLM) for creating display images. Examples of SLMs include liquid crystal display panels, liquid crystal on silicon panels, and digital light processors. The images to be displayed in such SLMs may, as an example, be pixilated. The data for generating the displayed images may contain separate sets of values for each pixel. Each value set may contain three values respectively defining the intensity of the light in three prime colors that a particular pixel of the SLM needs to create. The data for a color image therefore may be subdivided into red, green and blue images, which contain the intensity information for each of the pixels for the red, green and blue light, respectively. For a video display, each image to be displayed may be called a frame, and each frame may have a red, a green, and a blue sub-frame. The visual display system may, as examples, either display these sub-frames simultaneously, or time sequentially. In the case of sequential display, the red, green and blue sub-frames may be displayed in a time sequential manner faster than the image retention time of a human eye. The human eye may thus mix the three sub-frames together. As a result, a color image including all of the three sub-frames may appear to the human brain. Systems relating to sequential displays are provided herein.

Figure 1:
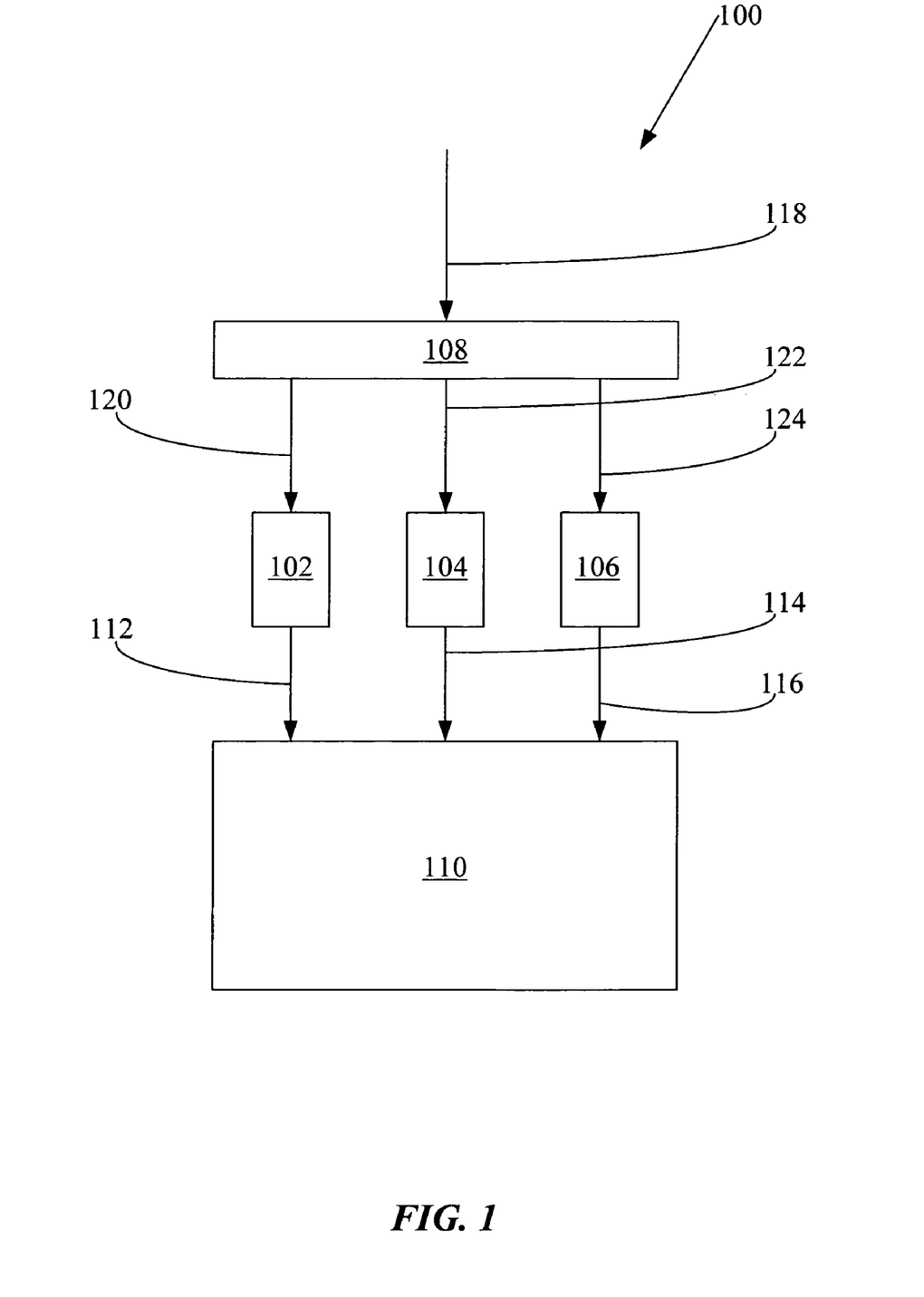
FIG. 1 is a perspective view showing an example of an implementation of a system.

FIG. 1 is a perspective view showing an example of an implementation of a system 100, including first, second and third light sources 102, 104, 106, and a controller 108. In an example, the system 100 may further include an image projector 110, or another device suitable for receiving and displaying light emitted by the first, second and third light sources 102, 104, 106. In another example (not shown), the third light source 106 may be omitted. The controller 108 may, for example, include a digital drive (not shown). The first, second and third light sources 102, 104, 106 are configured for generating first, second and third light beams respectively, represented by arrows 112, 114, 116. For example, the first, second and third light sources 102, 104, 106 may be configured for generating light beams having first, second and third perceptual or perceived colors collectively serving as three primes for generating color display frames. For example, a color display frame may include a color image encoded by digital data according to a selected color space. The first, second and third light beams respectively represented by the arrows 112, 114, 116 have first, second and third intensities, respectively. The first, second and third intensities, which are also respectively represented by the arrows 112, 114, 116, have respective first, second and third maxima that can be physically achieved by the first, second and third light sources 102, 104, 106. The image projector 110 of the example of a system 100 may be configured for generating a color display frame including sequentially-generated first, second and third sub-frames (not shown) respectively including first, second and third light beams represented by the arrows 112, 114, 116 respectively. The controller 108 is configured for receiving color control data or image data inputs represented by the arrow 118. The controller 108 is also configured for generating color control data outputs represented by the arrows 120, 122, 124 respectively controlling generation of the first, second and third light beams represented by the arrows 112, 114, 116 for defining the first, second and third sub-frames (not shown). The controller 108 is additionally configured for sequentially operating each of the first, second, and third light sources 102, 104, 106 respectively in temporally interleaved first, second and third light emission cycles (not shown) at substantially their maximum physically achievable intensities respectively represented by the arrows 112, 114, 116. The controller 108 may also be configured, for example, such that sequential display by an image projector 110 of first, second and third sub-frames respectively through the first, second and third light emission cycles collectively generate a color display frame in such an image projector having a perceptual white color when a white image frame is input into the image projector 110. As examples, such a perceptual white color may be a standard white perceptual color according to a selected color space, or any perceptual white color selected by an operator of the system 100.

The following conventions are understood throughout this specification by those skilled in the art. The term "total full energy" denotes the brightness of a light beam as perceived by the human eye. The brightness of a light beam as perceived by the human eye is approximately an integration of the total light energy detected by the human eye over an average image retention time period of the human brain. As an example, the brightness of a light beam as perceived by the human eye may be expressed as a product of an average intensity (or power) of the light beam multiplied by a light emission time period not in excess of the average image retention time period. For example, images may be displayed for viewing by the human eye at a color frame display rate of 60 frames per second, which equates with a maximum color frame display time period of about 17 milli-seconds (mS) per color display frame. At such an example of a color frame display rate, the human brain retains each color display frame image for a longer time period than the maximum color frame display time of about 17 mS, so that the human brain may perceive image changes successively recorded in the color display frames as being continuous motion. The eye may also integrate the three sub-frames of different colors into one color frame. In the example of a system 100, the 17 mS of a color display frame may be sequentially distributed among first, second and third sub-frames as earlier discussed. The term "substantially" as applied to a maximum physically achievable intensity means that a subject light source such as a first, second, or third light source 102, 104, 106, emits photons at a maximum physically achievable intensity that is approximately equivalent to a highest average rated achievable intensity output for the subject light source or for a light source having the same configuration. The term "substantially" as applied to an equivalent total full energy means that one subject total full energy is within plus or minus five percent (5%) of another subject total full energy.

The system 100 may, for example, be configured such that operating the first, second and third light sources 102, 104, 106 for equal time periods generates a color display frame having unequal intensities of the first, second and third light beams respectively represented by arrows 112, 114, 116. As an example, such a color display frame may have a bluish perceived color, whereas configuration of the system 100 may be useful to facilitate generation of a color display frame having a white perceived color. Further, for example, the configuration of the system 100 may be such that where equal time durations are allocated among the first, second and third sub-frames, the maximum achievable output intensity of one of the first, second and third light beams represented by the arrows 112, 114, 116 may be lower than may be needed for producing a selected standard white perceived color when combined with the other two of the first, second and third light beams represented by the arrows 112, 114, 116 where all of the first, second and third light sources 102, 104, 106 are operated at their maximum achievable intensities. In that case, for example, the configuration of the system 100 may be modified to redistribute the total time, e.g. 17 mS, available in the first, second and third sub-frames of the color display frame. As an example, distribution of the total display time for three sub-frames respectively having three different perceptual prime colors may intentionally be unequally allocated. For example, a time period during which light is emitted by a weakest, or lowest maximum achievable intensity light source, among the first, second and third light sources 102, 104, 106 to produce a corresponding perceptual prime color sub-frame may be configured as a longer time period than time periods during which the other two of the first, second and third light sources 102, 104, 106 emit light to produce their respective perceptual color sub-frames. As a further example, if equal time durations are allocated to light emission from each of the three light sources 102, 104, 106, the maximum achievable intensity of one of the light sources 102, 104, 106 represented respectively by the arrows 112, 114, 116 may be higher than that compatible for producing a predefined standard white perceived color when combined with the light emissions from other two light sources 102, 104, 104 also running at maximum achievable output intensities. Accordingly in such an example, the total time available for the first, second and third light emission cycles generating the three prime color sub-frames of a color display frame may be distributed such that the time period during which a highest-output intensity light source 102, 104, 106 emits light to produce the corresponding prime color sub-frame is shorter than time periods during which the other two light sources 102, 104, 106 emit light to produce their respective color sub-frames. The available time duration for a color display frame may be, for example, about seventeen (17) mS for a sixty (60) Hertz (Hz) color frame display rate. For maximum possible brightness, this available time duration may for example be allocated to the three sub-frames respectively of three selected prime colors such that two conditions are met: (1) all three light sources 102, 104, 106 run at their maximum physically achievable intensities; and (2) a white perceived color is produced by the image projector 110 matching the color coordinates of a pre-selected standard white.

As an example, the intensities of the first, second and third light beams integrated over the first, second and third time intervals, respectively, my collectively produce a perceived color of white light. In another example, the controller 108 may be configured to simultaneously direct the first, second and third light beams represented by the arrows 120, 122, 124 in first, second and third intervals, the fourth time intervals following the third intervals.

In an example, the third light beam represented by the arrow 124 may have an intensity that differs from the intensity of the first light beam represented by the arrow 120 and that differs from the intensity of the second light beam represented by the arrow 122. As another example, the system 100 may be configured such that a ratio of an integral of the intensity of the first light beam represented by the arrow 120 over the first time intervals to an integral of the intensity of the third light beam represented by the arrow 124 over the third time intervals is less than about 0.5times a ratio of the intensity of the first light beam to the intensity of the third light beam.

As an additional example, the first light source 102 may be configured for generating light within a first wavelength range of between about 500 nanometers and about 550 nanometers. Light within that first wavelength range generally has a color perceived as green by human eyesight. Further in that additional example, the second light source 104 may be configured for generating light within a second wavelength range of between about 400 nanometers and about 499 nanometers. Light within that second wavelength range generally has a color perceived as blue by human eyesight. Also in that additional example, the third light source 106 may be configured for generating light within a third wavelength range of between about 600 nanometers and about 650 nanometers. Light within that third wavelength range generally has a color perceived as red by human eyesight.

In an example, a ratio of an integral of the intensity of the first light beam represented by the arrow 120 over the first time intervals to an integral of the intensity of the second light beam represented by the arrow 122 over the second time intervals may be less than about 0.75 times a ratio of the intensity of the first light beam to the intensity of the second light beam. As another example, a ratio of an integral of the intensity of the first light beam represented by the arrow 120 over the first time intervals to an integral of the intensity of the second light beam represented by the arrow 122 over the second time intervals may be than about 0.5 times a ratio of the intensity of the first light beam to the intensity of the second light beam.

It is understood by those skilled in the art that any light sources 102, 104, 106 configured for emitting light at wavelengths or within wavelength ranges appropriate for generation of first, second and third sub-frames for a selected end-use application of the example of a system 100, which may also include a fourth sub-frame as discussed below as well as additional fifth or sixth sub-frames, etc., may be utilized. For example, light sources 102, 104, 106 configured for emitting light at wavelengths or within wavelength ranges for generating color combinations effective to reproduce perceptual colors within a selected perceptual color space may be utilized. The light sources 102, 104, 106 may include, as examples, laser devices, such as semiconductor diode lasers, diode-pumped solid state lasers, light-emitting diodes (LEDs), and vertical cavity surface emitting lasers (VCSELs) for example; and may include frequency-converted lasers. Examples of perceptual color spaces include the National Television System Committee ("NTSC"), Digital Cinema Initiatives ("DCI"), International Electro-technical Commission ("IEC") and sRGB color spaces.

Figure 2:
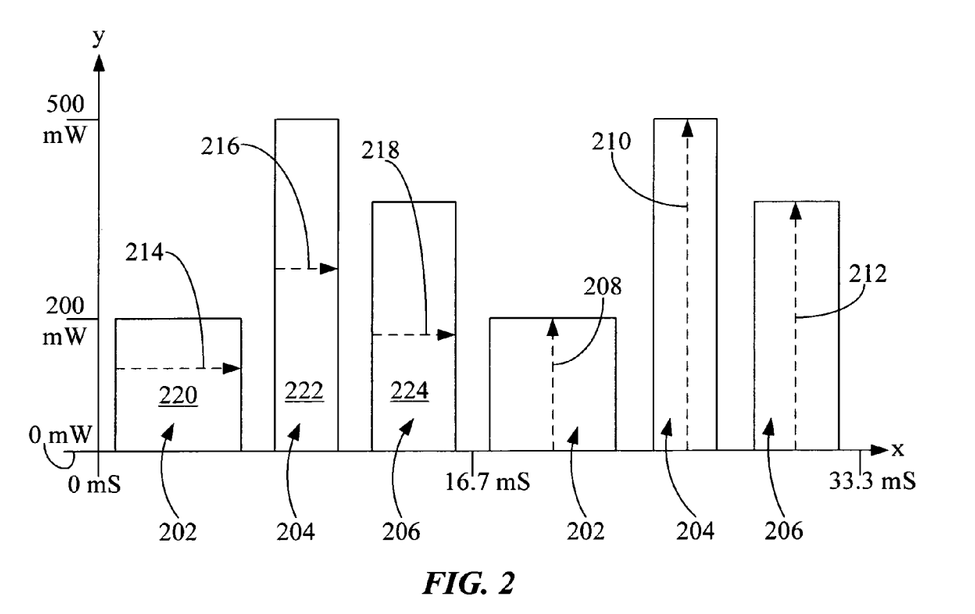
FIG. 2 is a time sequence graph schematically illustrating operation of an example of a system.

FIG. 2 is a time sequence graph schematically illustrating operation of an example of a system, including two successive sets of representative first, second and third light emission cycles 202, 204, 206 of the first, second, and third light sources 102, 104, 106, respectively. In FIG. 2, the x-axis represents the passage of time in milliseconds (mS) and schematically shows time periods during which the first, second and third light sources 102, 104, 106 emit light respectively in the first, second and third light emission cycles 202, 204, 206. The y-axis in FIG. 2 represents intensity of the first, second and third light beams represented by the arrows 112, 114, 116 in milli-watts (mW).

In the example schematically shown in FIG. 2, each of the first, second, and third light sources 102, 104, 106 are operated at substantially their maximum achievable intensities respectively represented by the arrows 208, 210, 212 in FIG. 2 and by the arrows 112, 114, 116 in FIG. 1. In this example, the first light source 102 may be configured for generating light within a first wavelength range of between about 500 nanometers and about 550 nanometers, generally having a color perceived as green by human eyesight. Further, the second light source 104 may be configured for generating light within a second wavelength range of between about 400 nanometers and about 499 nanometers, generally having a color perceived as blue by human eyesight. Also, the third light source 106 may be configured for generating light within a third wavelength range of between about 600 nanometers and about 650 nanometers, generally having a color perceived as red by human eyesight. The first light source 102 may, for example, include a fundamental light source emitting infrared electromagnetic radiation at a wavelength of about 1,060 nanometers, and an optical frequency doubling device configuring the first light source 102 for generating first light beams at a wavelength of about 532 nanometers. Such a first light source 102 may, for example, have a maximum achievable output intensity of about 200 mW. The second light source 104 may, for example, include a fundamental light source emitting visible light at a wavelength of about 460 nanometers, and may, for example, have a maximum achievable output intensity of about 500 mW. The third light source 106 may, for example, include a fundamental light source emitting visible light at a wavelength of about 640 nanometers, and may, for example, have a maximum achievable output intensity of about 400 mW. For these wavelengths, the Commission Internationale d'Eclairage ("CIE") standards require the ratios between the perceptual green, blue and red accumulated energy (intensity, meaning power, multiplied by duration) to be roughly 1:0.8:1.7 for producing the example of a standard white perceptual color having color coordinates (0.33, 0.33) in the CIE chromaticity chart. For primes of other wavelengths, it is understood by those skilled in that art that this ratio may be different, in accordance with the CIE standards. As an example, those ratios do not match the example maximum achievable output intensity (power) capability ratios among the examples of first, second and third lasers 102, 104, 106, of 200:500:300. Since the maximum achievable output intensity of the first light source 102 in this example is only about 200 mW, the first maximum achievable output intensity represented in FIG. 2 by the arrow 208 is lower than each of the second and third maximum achievable output intensities respectively represented in FIG. 2 by the arrows 210, 212. Further, since the maximum achievable output intensity of the second light source 104 in this example is about 500 mW, the second maximum achievable output intensity represented in FIG. 2 by the arrow 210 is higher than each of the first and third maximum achievable output intensities respectively represented in FIG. 2 by the arrows 208, 212.

Accordingly, in this example schematically shown in FIG. 2, a time period represented by an arrow 214 during which the first light source 102 emits light in the first light emission cycle 202 may be longer than time periods respectively represented by arrows 216, 218 during which the second and third light sources 104, 106 respectively emit light in the second and third light emission cycles 206, 208. Further in this example schematically shown in FIG. 2, the time period represented by the arrow 216 during which the second light source 104 emits light in the second light emission cycle 204, may be shorter than the time periods represented by the arrows 214, 218 during which the first and third light sources 102, 106 respectively emit light in the first and third light emission cycles 202, 206. Total energies of the first, second and third light emission cycles 202, 204, 206 may be schematically represented by the areas 220, 222, 224, respectively. The total energies of the first, second and third light emission cycles 202, 204, 206 may respectively be computed as products of the first, second and third maximum achievable output intensities respectively represented by the arrows 208, 210, 212, multiplied respectively by the time periods 214, 216, 218. As a result of these configurations of the example of a system 100 schematically shown in FIG. 2, the total energies of the first, second and third light emission cycles 202, 204, 206 represented by areas 220, 222, 224 may match the ratios of 1:0.8:1.7 suitable for the system 100 to produce a perceptual standard white color. Accordingly, each of the first, second and third light sources 102, 104, 106 in the example of a system 100 may be operated at their respective maximum achievable output intensities, yielding suitable energies of the first, second and third light emission cycles 202, 204, 206 for collectively producing a perceptual white color, despite differences between a suitable energy ratio (1:0.8:1.7) and the ratio of the maximum achievable output intensities among the first, second and third light sources 102, 104, 106.

Human eyesight is generally more sensitive to light within the first wavelength range of between about 500 nanometers and about 550 nanometers generally having a green perceived color, than to light within the second wavelength range of between about 400 nanometers and about 499 nanometers generally having a blue perceived color or to light within the third wavelength range of between about 600 nanometers and about 650 nanometers generally having a red perceived color. As the example in FIG. 2 illustrates, the time period represented by the arrow 214 during which the first light source 102 emits light in the first light emission cycle 202 may be longer than time periods respectively represented by arrows 216, 218 during which the second and third light sources 104, 106 respectively emit light in the second and third light emission cycles 206, 208. Accordingly, this example of a system 100 displays light having a perceived green color in the first sub-frame (not shown) during a longer time period, represented by the arrow 214, than time periods represented by the arrows 216, 218 during which this example of a system 100 displays light having perceived blue and red colors respectively in the second and third sub-frames (not shown). Since the human eye is more sensitive to perceptually green light than to perceptually blue or red light compared to systems with equal time allocation between the first, second and third light illumination cycles where the first (green) light source illuminate 33% of the available 17 ms, this configuration of the system 100 may enhance the perceived visibility and brightness of an image collectively displayed in the image projector 110 by the first, second and third sub-frames (not shown).

In a further example, an image projector 110 that may be included in the system 100 may modulate a selected portion of the first, second and third light beams represented by the arrows 112, 114, 116 that may be respectively visible in the first, second and third sub-frames (not shown) during a given first, second or third light emission cycle 202, 204, 206, respectively. For example, the image projector 110 may include a spatial light modulator, such as a digital light processor (DLP) including a digital micro-mirror device (DMD) configured for either reflecting a first, second or third light beam respectively represented by the arrows 112, 114, 116 to be visually displayed by the image projector 110, or for blocking that visual display such as by sending the light beam to a heat sink or a light dump. As another example of a spatial light modulator, the image projector 110 may include a liquid crystal display (LCD) configured for controlling polarization of light of the first, second and third light beams represented by the arrows 112, 114, 116 to either allow or block display of such light beams after their reflection or transmission in the LCD. An LCD may include, as another example, a liquid crystal on silicon display (LCoS). In each of these examples of an image projector 110, the brightness of each pixel is determined by the ratio between the time during which the light is allowed to be transmitted or reflected for display, and the time during which the light is blocked. A higher such ratio results in a higher brightness level. During the time period of each light emission cycle, such an spatial light modulator switches the image projector 110 between visual display and blockage of emitted light, occupying an on-off cycle time of the image projector 110. Referring to FIG. 2, dividing one of the time periods represented by the arrows 214, 216, 218 by the on-off cycle time of the image projector 110 yields a value for a number of on-off cycles included in each of the first, second and third sub-frames (not shown). As earlier explained, a perceptual color of light is approximately cumulative over each of the time periods represented by the arrows 214, 216, 218, limited by an average image retention time period of the human brain. Hence, the number of on-off cycles included in each of the first, second and third sub-frames (not shown) determines the range of different gradations of depths of perceptual color that may be visualized in each of the first, second and third sub-frames. For example, the time period represented by the arrow 214 during which the example of a system 100 displays light having a perceived green color in the first sub-frame (not shown) may be lengthened relative to the time periods represented by the arrows 216, 218 during which this example of a system 100 displays light having perceived blue and perceived red colors respectively in the second and third sub-frames (not shown). This lengthening of the time period represented by the arrow 214 increases a number of on-off cycles for the image projector 110 that are included within the first sub-frame (not shown) of perceptual green colors. Hence, the range of different gradations of depths of perceptual green color that may be visualized in the first sub-frame may be increased relative to the ranges of different gradations of depths of perceptual blue and perceptual red color that may be visualized in each of the second and third sub-frames. Since human eyesight is generally more sensitive to perceptual green colors than to perceptual blue or perceptual red colors, this lengthening of the time period represented by the arrow 214 may enhance the perceptual color spectrum that may be effectively generated by the example of a system 100. Further, for example, an image projector 110 that may be included in the system 100 may include a plurality of discrete elements for controlled visual display of light beams, such as a micro-mirror array or a pixel array. Then, for example, the above-discussed examples of configuration and operation of an image projector 110 may be carried out on a micro-mirror by micro-mirror basis, or on a pixel by pixel basis.

In another example of a system 100, the controller 108 may be configured for pulsed operation of the first, second or third light source 102, 104, 106 during the first, second or third light emission cycle 202, 204, 206, respectively. For example, pulsed operation of the first, second or third light source 102, 104, 106 may result in higher maximum achievable output intensities respectively represented by the arrows 208, 210, 212 in FIG. 2. Further, pulsed operation of the first, second or third light source 102, 104, 106 may result in higher total energies of the first, second and third light emission cycles 202, 204, 206 as schematically represented by the areas 220, 222, 224, respectively. Since human eyesight is generally more sensitive to perceptual green colors than to perceptual blue or perceptual red colors, in another example the controller 108 may be configured selectively for pulsed operation of the first light source 102, configured for generating light having a perceptual green color, within a first wavelength range of between about 500 nanometers and about 550 nanometers. As an additional example, pulsed operation during the first, second or third light emission cycles 202, 204, 206 may be carried out in a "comb" pattern including a plurality of cycles within the time period represented by the arrows 214, 216, 218 in which the first, second or third light source 102, 104, 106 sequentially is off and then is operated at maximum achievable output intensity. In further examples, the first, second, and third light sources 102, 104, 106 may be operated in a continuous wave mode.

As an example, the controller 108 may be configured for pulsed operation of the first light source 102 during the first light emission cycle. The controller 108 may likewise be configured for pulsed operation of the second and/or third light sources 104, 106 during the second and third emission cycles. As another example, the controller 108 may be configured for generating a sub-period of the first light emission cycle when the first light source 102 emits light, having a different duration than another sub-period of the first light emission cycle when the first light source 102 does not emit light. The second and third emission cycles of the second and/or third light sources 104, 106 may be likewise generated by configuring the controller 108 accordingly.

Figure 3:
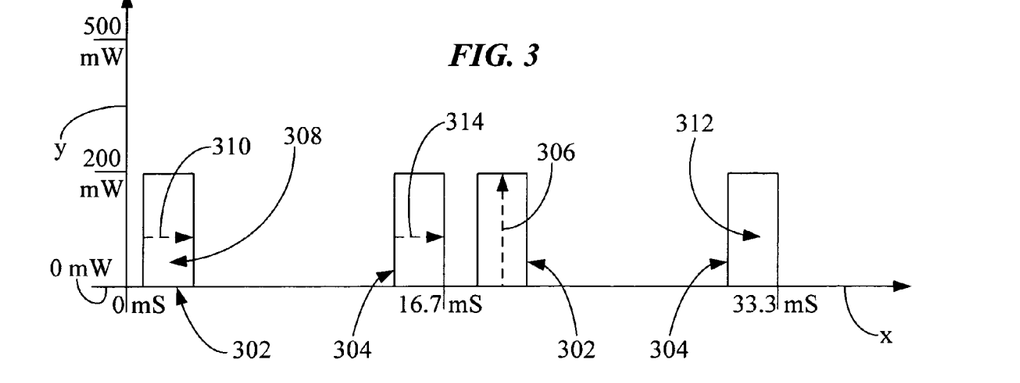
FIG. 3 is a time sequence graph schematically illustrating operation of a portion of another example of a system.
Figure 4:
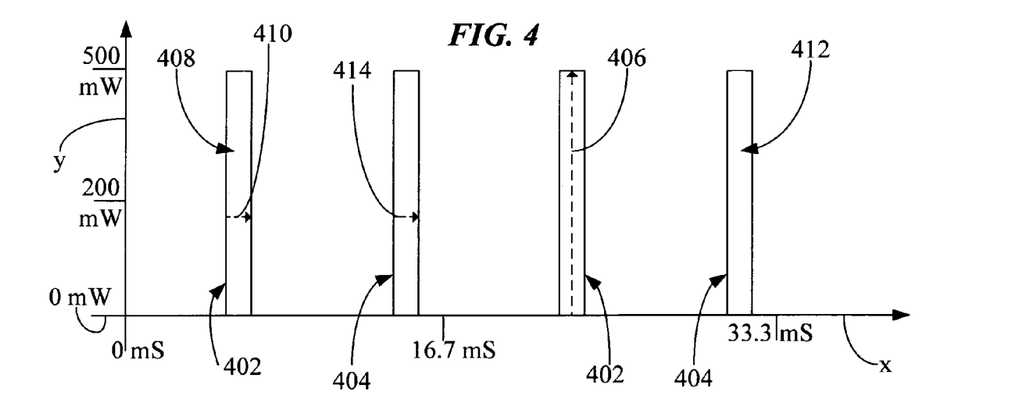
FIG. 4 is a time sequence graph schematically illustrating operation of another portion of the example of a system of FIG. 3.
Figure 5:
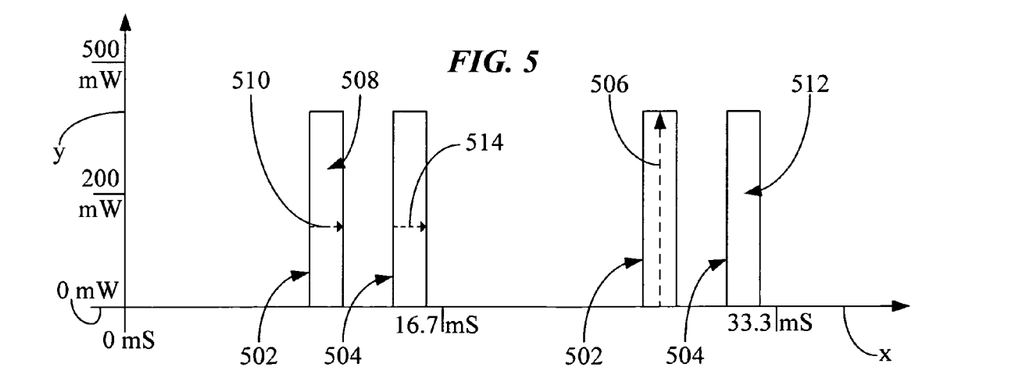
FIG. 5 is a time sequence graph schematically illustrating operation of an additional portion of the system of FIGS. 3 and 4.

FIG. 3 is a time sequence graph schematically illustrating operation of a portion of another example of a system 100. FIG. 4 is a time sequence graph schematically illustrating operation of another portion of the example of a system 100 of FIG. 3. FIG. 5 is a time sequence graph schematically illustrating operation of an additional portion of the system 100 of FIGS. 3 and 4. FIGS. 3-5 respectively include two successive sets of representative first, second, and third light emission cycles 302, 402, 502 of the first, second, and third light sources 102, 104, 106, respectively. FIGS. 3-5 also respectively include two successive sets of representative fourth light emission cycles 304, 404, 504 of the first, second, and third light sources 102, 104, 106, respectively. In FIGS. 3-5, the x-axes represent the passage of time in milliseconds (mS) and schematically show time periods during which the first, second and third light sources 102, 104, 106 emit light respectively in the first, second, and third light emission cycles 302, 402, 502. The x-axes further schematically show time periods during which all of the first, second and third light sources 102, 104, 106 emit light in the fourth light emission cycle 304, 404, 504. The y-axes in FIGS. 3-5 represent intensities of the first, second and third light beams 112, 114, 116 in mW.

In the example of a system 100 schematically shown collectively in FIGS. 3-5, the first, second, and third light sources 102, 104, 106 are respectively operated at substantially their maximum achievable output intensities respectively represented by the arrows 306, 406, 506 in FIGS. 3-5 during the first, second and third light emission cycles 302, 402, 502, analogously to operation of the example of a system 100 discussed above in connection with FIG. 2. Configuration and operation of the controller 108, the first, second, and third light sources 102, 104, 106, and an image projector 110 if included, during the first, second and third light emission cycles 302, 402, 502 may be carried out analogously to configuration and operation of the controller 108, the first, second, and third light sources 102, 104, 106, and if included, the image projector 110, during the first, second and third light emission cycles 202, 204, 206 discussed above in connection with FIG. 2. Further, for example, the system 100 may be configured for sequentially generating the fourth sub-frame (not shown) after sequentially generating the first, second and third sub-frames (not shown), the fourth sub-frame having a perceived high intensity and including first, second and third light beams 112, 114, 116. The ratio between the intensities of the first, second and third light beams 112, 114, 116 during the fourth sub-frame may for example be determined as suitable for generating a selected perceptual white color. As an example, the controller may be configured for generating secondary color control data outputs encoding a perceptual white color, controlling generation of the first, second and third light beams 112, 114, 116 for defining the fourth sub-frame.

A total full energy of the first light emission cycle 302 may be schematically represented by the area 308. The total full energy of the first light emission cycle 302 may be computed as a product of the first maximum achievable intensity represented by the arrow 306 multiplied by the time period represented by the arrow 310. A total full energy of the second light emission cycle 402 may be schematically represented by the area 408. The total full energy of the second light emission cycle 402 may be computed as a product of the second maximum achievable intensity represented by the arrow 406 multiplied by the time period represented by the arrow 410. A total full energy of the third light emission cycle 502 may be schematically represented by the area 508. The total full energy of the third light emission cycle 502 may be computed as a product of the third maximum achievable intensity represented by the arrow 506 multiplied by the time period represented by the arrow 510. A total full energy of the fourth light emission cycle 304, 404, 504 may be schematically represented by the areas 312, 412, 512. The total full energy of the fourth light emission cycle 304, 404, 504 may be computed as the sum of products of the maximum achievable intensities represented by the arrows 306, 406, 506 respectively multiplied by the time periods represented by the arrows 314, 414, 514.

In the above examples, each of the three light sources 102, 104, 106 may emit light through the four sub-frames of a color display frame for a longer overall time period compared to the previous examples using only three sub-frames. The resulting brightness of the displayed image may therefore be enhanced. In these examples, the controller 108 may be configured to generate video data for a pixel array of an image projector 110 such as a spatial light modulator, for the fourth sub-frame in the fourth light emission cycle. The needed video data for the fourth light emission cycle may be determined based on the video data specified by the color control data input 118 for the first, second and third light emission cycles. In a specific example, for each pixel, the video data for the fourth light emission cycle may be equal to a minimum of the video data for the first, second and third cycles for the same pixel.

In another example, a system 100 may be configured so that the first maximum achievable output intensity represented by the arrow 306 is lower than each of the second and third maximum achievable output intensities represented by the arrows 406, 506. For example, the first light source 102 may be configured for generating light within a wavelength range of between about 500 nanometers and about 550 nanometers. Further in that example, the controller 108 may be configured for maximizing the intensity of the first light beams represented by the arrow 112 in the secondary color control data outputs. In that manner, since human eyesight is generally more sensitive to perceptual green colors than to perceptual blue or red colors, visibility and brightness of the visual display in the image projector 110 may be enhanced.

The example of a system 100 shown in FIGS. 3-5 may be configured to generate one or more further light emission cycles (not shown) in addition to the first, second, third and fourth light emission cycles 302, 402, 502, 304, 404, 504.

Figure 6:
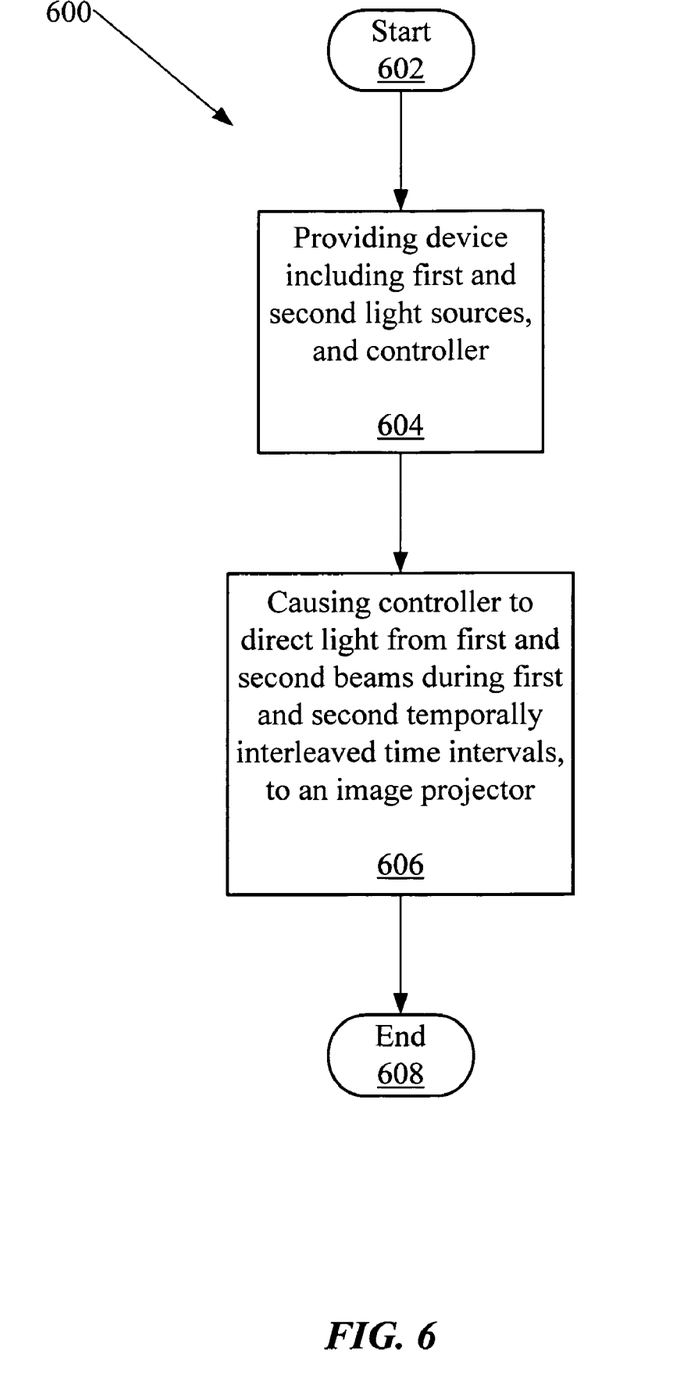
FIG. 6 is a flow chart showing an example of an implementation of a method of operating an imaging system having a multi-color light source as illustrated in FIGS. 2-5.

FIG. 6 is a flow chart showing an example of an implementation of a method 600 of operating an imaging system having a multi-color light source as illustrated in FIGS. 2-5. The method starts at step 602, and then at step 604 a device is provided that includes providing a first light source 102 configured to generate a first light beam represented by the arrow 112 of a first perceived color, a second light source 104 configured to generate a second light beam represented by the arrow 114 of a different second perceived color, and a controller 108 configured to direct light from the first and second light beams represented by the arrows 112, 114 to an image projector 110. The first light source 102 generates the first light beam represented by the arrow 112 with a first intensity, and the second light source 104 generates the second light beam represented by the arrow 114 with a different second intensity. In an example, providing the device at step 604 may further include providing such an image projector. Step 606 includes causing the controller 108 to direct light from the first light beam represented by the arrow 112 to an image projector 110 during first time intervals, and to direct light from the second light beam represented by the arrow 114 to an image projector 110 during second time intervals. Causing the controller 108 in step 606 to direct light from the first and second light beams represented by the arrows 112, 114 to an image projector 110 further includes configuring the controller 108 to temporally interleave the first and second time intervals such that the second time intervals are longer than the first time intervals. The method may then end at step 608.

In an example, step 604 may include providing an image projector 110. As another example, step 606 may include controlling a ratio of an integral of the intensity of the first light beam represented by the arrow 120 over the first time intervals to an integral of the intensity of the second light beam represented by the arrow 122 over the second time intervals to less than about 0.75 times a ratio of the intensity of the first light beam to the intensity of the second light beam. As another example, step 606 may include controlling a ratio of an integral of the intensity of the first light beam represented by the arrow 120 over the first time intervals to an integral of the intensity of the second light beam represented by the arrow 122 over the second time intervals to less than about 0.5 times a ratio of the intensity of the first light beam to the intensity of the second light beam.

As another example, step 604 may include providing a third light source 106 configured to generate a third light beam of a third perceived color represented by the arrow 124, the third perceived color differing from the first and second perceived colors; and step 606 may include causing the controller 108 to direct the third light beam to an image projector 10 during third time intervals, the third time intervals being temporally interleaved between the first time intervals and the second time intervals such that the third time intervals are shorter than the first or second time intervals. Further, for example, the third light beam may have an intensity that differs from the intensity of the first light beam and differs from the intensity of the second light beam.

In a further example, step 606 may include causing the controller 108 to control a ratio of an integral of the intensity of the first light beam over the first time intervals to an integral of the intensity of the third light beam over the third time intervals to less than about 0.5 times a ratio of the intensity of the first light beam to the intensity of the third light beam. As an additional example, step 606 may include causing the controller 108 to control the intensities of the first, second and third light beams integrated over the first, second and third time intervals, respectively, to collectively produce a perceived color of white light.

As another example, step 606 may include causing the controller to simultaneously direct the first, second and third light beams to an image projector 110 during fourth time intervals, the fourth time intervals following the third intervals.

Further, for example, step 604 may include providing the first light source as configured for generating light within a wavelength range of between about 500 nanometers and about 550 nanometers. In addition, for example, step 604 may include providing the second light source as configured for generating light within a wavelength range of between about 400 nanometers and about 499 nanometers.

In an example, step 606 may include causing the controller 108 to pulse emissions of light from the first light source during the first light emission cycle. As another example, step 606 my include causing the controller 108 to generate a sub-period of the first light emission cycle when the first light source emits light, having a different duration than another sub-period of the first light emission cycle when the first light source does not emit light.

The teachings of this specification may be utilized in conjunction with the following commonly-owned U.S. patent applications filed on the same date herewith. The entireties of each of these U.S. patent applications are hereby incorporated herein by reference: G. Chen 12-22, "DIFFUSER CONFIGURATION FOR AN IMAGE PROJECTOR" by Gang Chen and Roland Ryf (attorney Y. Gruzdkov); G. Chen 11-21, "SYSTEM AND METHOD FOR COLOR-COMPENSATING A VIDEO SIGNAL HAVING REDUCED COMPUTATIONAL REQUIREMENTS" by Gang Chen and Roland Ryf (attorney D. Hitt); G. Chen 14-1-24, "TIME DIVISION MULTIPLEXING A DC-TO-DC VOLTAGE CONVERTER" by Gang Chen, David A. Duque, and Roland Ryf (attorney J. McCabe). Furthermore, various examples herein may utilize optical projectors, multi-color light sources, speckle reduction methods and structures, and/or spatial light modulators (SLMs) described in the following four patent applications, the entireties of each of which are hereby incorporated by reference in this application: U.S. patent application Ser. No. 11/713207 filed Mar. 2, 2007 by Randy C. Giles et al; U.S. patent application Ser. No. 11/681,376 filed Mar. 2, 2007 by Vladimir A. Aksyuk et al; U.S. patent application Ser. No. 11/713,155 filed Mar. 2, 2007 by Vladimir A. Aksyuk et al; and U.S. patent application Ser. No. 11/713,483 filed Mar. 2, 2007 by Gang Chen et al., and/or may be utilized in optical projectors and optical image formation methods described in these patent applications.

The system 100 may, for example, be utilized as a multi-color light source. The system 100 may, for example, be utilized together with and may include an image projector. The system 100 may, for example, include any type of image projector suitable for receiving inputs of and for displaying light source beams. Likewise, the method 600 may be utilized in connection with operating a suitable system including a plurality of light sources and a controller, and may in examples further include an image projector, of which the systems 100 disclosed are only examples. While the foregoing description refers in some instances to the system 100, it is appreciated that the subject matter is not limited to these structures, nor to the structures discussed in the specification. Other configurations of apparatus may be utilized consistent with the teachings herein. Likewise, the method 600 may include additional steps and modifications of the indicated steps.

Moreover, it will be understood that the foregoing description of numerous examples has been presented for purposes of illustration and description. This description is not exhaustive and does not limit the claimed invention to the precise forms disclosed. Modifications and variations are possible in light of the above description or may be acquired from practicing the invention. The claims and their equivalents define the scope of the invention.

What is claimed is:

1. A system, comprising:
   a first light source configured to generate a first light beam of a first perceived color;
   a second light source configured to generate a second light beam of a different second perceived color; and
   a controller configured to direct light from the first light beam to an image projector during first time intervals and to direct light from the second light beam to the image projector during second time intervals; and
   wherein the first light source generates the first light beam with a first intensity, and the second light source generates the second light beam with a different second intensity; and
   wherein the controller is configured to temporally interleave the first and second time intervals such that the second time intervals are longer than the first time intervals.

2. The system of claim 1, including an image projector, wherein the image projector is configured to display light from the first and second light beams such that, as displayed by the image projector, the second time intervals are longer than the first time intervals.

3. The system of claim 1, further including a third light source configured to generate a third light beam of a third perceived color, the third perceived color differing from the first and second perceived colors; and
   wherein the controller is configured to direct light from the third light beam to the image projector during third time intervals, the third time intervals being temporally interleaved between the first time intervals and between the second time intervals such that the third time intervals are shorter than the first and second time intervals.

4. The system of claim 3, wherein the third light beam has a third intensity that differs from the first intensity and differs from the second intensity.

5. The system of claim 3, wherein the first, second and third intensities, respectively integrated over the first, second and third time intervals, collectively produce a perceived color of white light.

6. The system of claim 3 wherein the controller is configured to simultaneously direct light from the first, second and third light beams to the image projector during fourth time intervals, the fourth time intervals following the third time intervals, and wherein the first, second and third intensities are selected to collectively produce a perceived color of white light.

7. The system of claim 1, wherein the second light source is configured for generating light within a wavelength range of between about 500 nanometers and about 550 nanometers.

8. The system of claim 1, wherein the controller is configured for pulsed operation of the first light source during the first time intervals.

9. The system of claim 8, wherein the controller is configured for generating a sub-period of the first time intervals when light from the first light source is directed to the image projector, having a different duration than another sub-period of the first time intervals when light from the first light source is not directed to the image projector.

10. A method, comprising:
    providing a first light source configured to generate a first light beam of a first perceived color, a second light source configured to generate a second light beam of a different second perceived color, and a controller configured to direct light from the first and second light beams to an image projector;
    wherein the first light source generates the first light beam with a first intensity, and the second light source generates the second light beam with a different second intensity; and
    causing the controller to direct light from the first light beam to the image projector during first time intervals, and to direct light from the second light beam to the image projector during second time intervals;
    wherein causing the controller to direct light from the first and second light beams to the image projector includes causing the controller to temporally interleave the first and second time intervals such that the second time intervals are longer than the first time intervals.

11. The method of claim 10, including providing an image projector, and wherein causing the controller to direct light to the image projector includes causing the image projector to display light from the first and second light beams such that, as displayed by the image projector, the second time intervals are longer than the first time intervals.

12. The method of claim 10, including providing a third light source configured to generate a third light beam of a third perceived color, the third perceived color differing from the first and second perceived colors; and wherein causing the controller to direct light includes causing the controller to direct light from the third light beam to the image projector during third time intervals, the third time intervals being temporally interleaved between the first time intervals and between the second time intervals such that the third time intervals are shorter than the first and second time intervals.

13. The method of claim 12, wherein the third light beam has a third intensity that differs from the first intensity and differs from the second intensity.

14. The method of claim 12, wherein the first, second and third intensities, respectively integrated over the first, second and third time intervals, collectively produce a perceived color of white light.

15. The method of claim 12, wherein causing the controller to direct light includes causing the controller to simultaneously direct light from the first, second and third light beams to the image projector during fourth time intervals, the fourth time intervals following the third time intervals, and wherein the first, second and third intensities are selected to collectively produce a perceived color of white light.

16. The method of claim 10, wherein the second light source is configured for generating light within a wavelength range of between about 500 nanometers and about 550 nanometers.

17. The method of claim 10, wherein causing the controller to direct light includes causing the controller to pulse emissions of light from the first light source during the first time intervals.

18. The method of claim 17, wherein causing the controller to pulse emissions of light includes causing the controller to generate a sub-period of the first time intervals when light from the first light source is directed to the image projector, having a different duration than another sub-period of the first time intervals when light from the first light source is not directed to the image projector.

19. The system of claim 1, wherein the first intensity is fixed at a substantially maximum output capability of the first light source and the second intensity is fixed at a substantially maximum output capability of the second light source.

20. The system of claim 1, wherein the controller is configured for computing lengths for the first time intervals as being quotients of a total full energy of the first perceived color to be displayed by the image projector, divided by the first intensity.

21. The system of claim 20, wherein the controller is configured for computing lengths for the second time intervals as being quotients of a total full energy of the second perceived color to be displayed by the image projector, divided by the second intensity; and wherein the first intensity is fixed at a substantially maximum output capability of the first light source and the second intensity is fixed at a substantially maximum output capability of the second light source.

22. The system of claim 1, wherein the first intensity is fixed at a substantially maximum output capability of the first light source, wherein the second intensity is fixed at less than a substantially maximum output capability of the second light source, and wherein the second light source is configured for generating light having a green perceived color within a wavelength range of between about 500 nanometers and about 550 nanometers.

23. The method of claim 10, wherein generating the first light beam includes fixing the first intensity at a substantially maximum output capability of the first light source; and wherein generating the second light beam includes fixing the second intensity at a substantially maximum output capability of the second light source.

24. The method of claim 10, wherein causing the controller to direct light from the first light beam to the image projector includes computing lengths for the first time intervals as being quotients of a total full energy of the first perceived color to be displayed by the image projector, divided by the first intensity.

25. The method of claim 24, wherein causing the controller to direct light from the second light beam to the image projector includes computing lengths for the second time intervals as being quotients of a total full energy of the second perceived color to be displayed by the image projector, divided by the second intensity; and wherein generating the first light beam includes fixing the first intensity at a substantially maximum output capability of the first light source; and wherein generating the second light beam includes fixing the second intensity at a substantially maximum output capability of the second light source.

26. The method of claim 10, wherein generating the first light beam includes fixing the first intensity at a substantially maximum output capability of the first light source; wherein generating the second light beam includes fixing the second intensity at less than a substantially maximum output capability of the second light source; and wherein the second light source generates light having a green perceived color within a wavelength range of between about 500 nanometers and about 550 nanometers.

* * * * *